(12) United States Patent
Chung et al.

(10) Patent No.: US 8,794,367 B2
(45) Date of Patent: Aug. 5, 2014

(54) SENSING SYSTEM AND MOVING ROBOT HAVING THE SAME

(75) Inventors: Woo Ram Chung, Seoul (KR); Jae Man Joo, Suwon-si (KR); Jun Hwa Lee, Suwon-si (KR); Jun Pyo Hong, Suwon-si (KR); Hwi Chan Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 487 days.

(21) Appl. No.: 13/086,887

(22) Filed: Apr. 14, 2011

(65) Prior Publication Data

US 2011/0278082 A1 Nov. 17, 2011

(30) Foreign Application Priority Data

May 11, 2010 (KR) ......................... 10-2010-0043914

(51) Int. Cl.
*B62D 1/24* (2006.01)

(52) U.S. Cl.
USPC ........................................................ 180/167

(58) Field of Classification Search
USPC .................. 180/167, 168, 169; 250/206, 216; 246/1 C, 167 R, 473.3, 473 R, 1 R; 340/901–904, 425.5, 435, 436; 356/141.1, 141.4, 141.5
See application file for complete search history.

(56) References Cited

U.S. PATENT DOCUMENTS

| 5,831,717 | A | * | 11/1998 | Ikebuchi ...................... 356/4.01 |
| 6,592,080 | B2 | * | 7/2003 | Murata et al. ................. 246/1 C |
| 7,812,931 | B2 | * | 10/2010 | Nishiuchi ..................... 356/3.11 |
| 2002/0185572 | A1 | | 12/2002 | Murata et al. |

FOREIGN PATENT DOCUMENTS

| DE | 40 40 894 C1 | 4/1992 |
| WO | 93/03399 | 2/1993 |
| WO | 00/79319 A1 | 12/2000 |

OTHER PUBLICATIONS

European Search Report dated Sep. 7, 2011 in corresponding European Patent Application 11163823.5.
Chinese Office Action mailed Jan. 24, 2014 in corresponding Chinese Application No. 201110119334.7.

* cited by examiner

*Primary Examiner* — John Walters
*Assistant Examiner* — James Triggs
(74) *Attorney, Agent, or Firm* — Staas & Halsey LLP

(57) ABSTRACT

A moving robot includes a sensing system. The moving robot includes light sources generating light, an optical guide to receive, diffuse, and emit the light generated from the light source, and light receiving sensors to receive the light emitted from the optical guide and then reflected by the object. Light irradiated from the light sources is diffused and emitted to a wide region through the optical guide, thereby allowing light to be emitted to the wide region with a small number of the light sources.

18 Claims, 5 Drawing Sheets

SENSING SYSTEM AND MOVING ROBOT HAVING THE SAME

CROSS-REFERENCE TO RELATED APPLICATIONS

This application claims the priority benefit of Korean Patent Application No. 10-2010-0043914, filed on May 11, 2010 in the Korean Intellectual Property Office, the disclosure of which is incorporated herein by reference.

BACKGROUND

1. Field

Embodiments relate to a sensing system which senses an object adjacent to the sensing system, and a moving robot having the same.

2. Description of the Related Art

Recently, moving robots, such as a cleaner robot, have entered into widespread use. Such a cleaner robot includes a sensing system to sense an object adjacent to the cleaner robot so as to prevent the cleaner robot from colliding with a wall or a piece of furniture during movement of the cleaner robot or from being damaged due to driving off of an end point of a floor.

The sensing system includes optical sensors. The optical sensor includes a light emitting part having a light source embedded therein to emit light, and a light receiving part to receive the light emitted from the light emitting part and then reflected by an object adjacent to the sensing system, and an overlapped area, between a light emitting region in which the light emitted from the light emitting part is dispersed and a light receiving region in which the light receiving part receives the light, becomes a sensing region in which the optical sensor may sense the object.

SUMMARY

Therefore, it is an aspect to provide a sensing system which emits light to a wider region, and a moving robot having the same.

Additional aspects will be set forth in part in the description which follows and, in part, will be obvious from the description, or may be learned by practice of the invention.

In accordance with one aspect, a sensing system includes a light source generating light, an optical guide to diffuse and emit the light generated from the light source, and light receiving sensors to receive the light emitted from the optical guide and then reflected by an object adjacent to the sensing system.

The optical guide may be extended in one direction, and the light source may be installed at least one of both end surfaces of the optical guide.

A reflection plane may be provided on one side surface of the optical guide so as to reflect light entering the optical guide toward the other side surface.

In accordance with another aspect, a moving robot includes a main body, and a sensing system to sense an object around the main body, wherein the sensing system includes a light source generating light, an optical guide to receive, diffuse, and emit the light generated from the light source, and light receiving sensors to receive the light emitted from the optical guide and then reflected by the object.

The main body may be formed in a disc shape, and the optical guide may be extended in the circumferential direction of the main body to correspond to the main body, and disposed on the front surface of the main body.

The light source may be installed at least one of both end surfaces of the optical guide, and the light generated from the light source may enter the optical guide through both end surfaces of the optical guide.

The moving robot may further include a reflection plane provided on the rear surface of the optical guide so as to reflect light entering the optical guide toward the front surface of the optical guide.

A plurality of reflection grooves to form the reflection plane may be provided on the rear surface of the optical guide.

The moving robot may further include a reflection member disposed at the rear of the optical guide to reflect light, emitted backwards from the optical guide, forwards.

The light receiving sensors may include obstacle sensors disposed above the optical guide to receive light from the lower portion of an area in front of the optical guide.

The light receiving sensors may include floor sensors to receive light emitted downwards from the optical guide and then reflected by a floor.

The moving robot may further include a bumper installed at one side of the main body so as to move forward and backward, the optical guide being disposed on the bumper, and the light receiving sensors may include bumper sensors disposed at the rear of the optical guide of the main body to receive light emitted through the rear surface of the optical guide.

Each of the light receiving sensors may include a sensing part to sense light, and a light receiving lens disposed in front of the sensing part to determine light receiving regions of the light receiving sensors.

The light receiving lens may be an asymmetric lens in which a light receiving region in the vertical direction and a light receiving region in the horizontal direction are independently determined.

A transparent window may be formed through the bumper at a position corresponding to the obstacle sensors.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
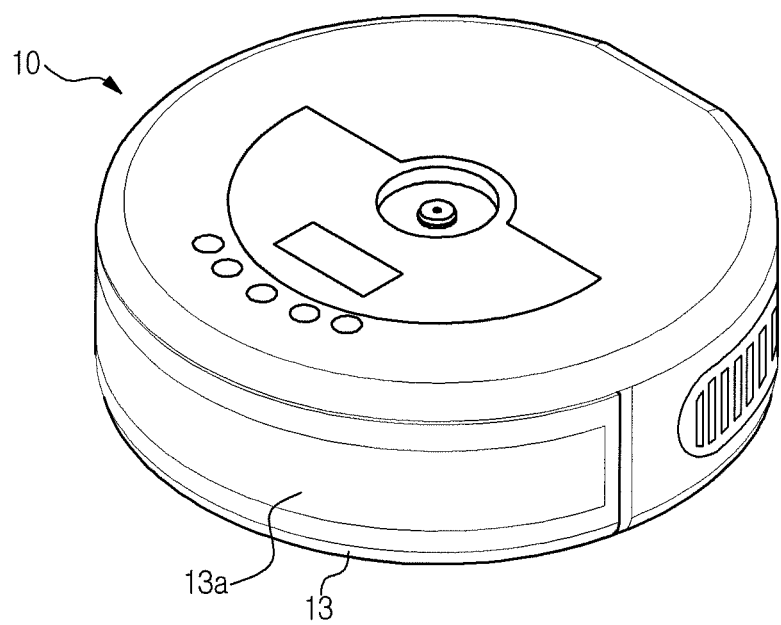
FIG. 1 is a perspective view of a moving robot in accordance with one embodiment.

Reference will now be made in detail to the embodiments, examples of which are illustrated in the accompanying drawings, wherein like reference numerals refer to like elements throughout.

Hereinafter, a sensing system and a moving robot having the same in accordance with one embodiment will be described with reference to the accompanying drawings.

As shown in FIG. 1, a moving robot 100 in accordance with an embodiment includes a main body 10, wheels 11 and 12 (with reference to FIG. 3) disposed on the lower surface of the main body 10 to allow the main body 10 to move, and a bumper 13 disposed on the front portion of the main body 10.

The main body 10 is formed in an about disc shape, for example, and the wheels 11 and 12 may include a pair of moving wheels 11 disposed in parallel at both sides of the lower surface of the main body 10, and a caster wheel 12 disposed at the front portion of the lower surface of the main body 10. The bumper 13 is installed on the front surface of the main body 10 such that the bumper 13 may move forwards and backwards, and is elastically supported by the main body 10 through an elastic member (not shown), thereby reducing impact transmitted to the main body 10 even if the moving robot 100 inevitably collides with an obstacle, such as a wall or a piece of furniture.

Figure 2:
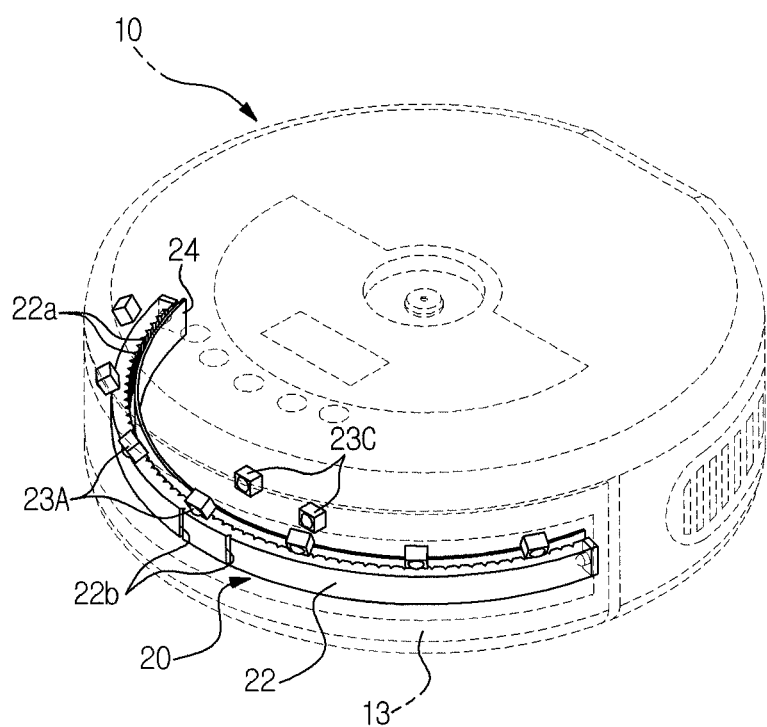
FIG. 2 is a perspective view of a sensing system applied to the moving robot in accordance with the embodiment
Figure 3:
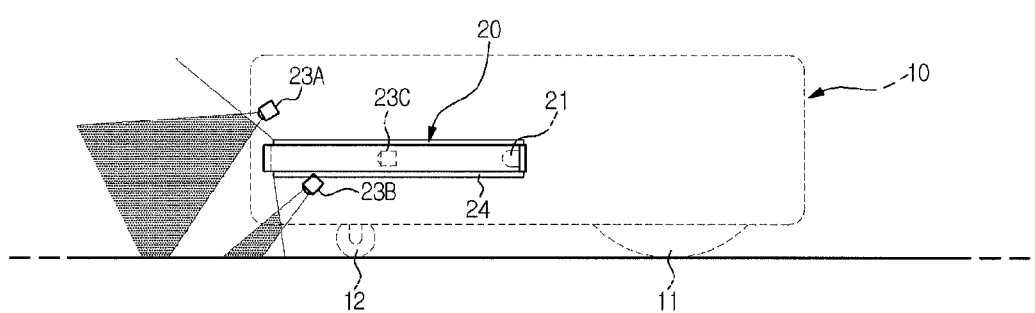
FIGS. 3 and 4 are schematic views of the sensing system applied to the moving robot in accordance with the embodiment.

As shown in FIGS. 2 and 3, the moving robot 100 of the embodiment of FIG. 1 further includes a sensing system 20 which senses an object around the moving robot 100, such as a wall, a piece of furniture, or a floor, during movement of the moving robot 100 to prevent the moving robot 100 from colliding with the object or falling.

The sensing system 20 includes light sources 21 to generate light, an optical guide 22 to receive the light generated from the light sources 21 and widely diffuse the received light through surfaces of the optical guide 22, and light receiving sensors 23A, 23B, and 23C to receive the light diffused by the optical guide 22 and then reflected by an object adjacent to the moving robot 100.

When the light is diffused through the surfaces of the optical guide 22, the light may be emitted to a wide region using only a small number of the light sources 21, thereby allowing a designer to install the light receiving sensors 23A, 23B, and 23C at various positions. That is, the light entering the optical guide 22 is gradually diffused while moving in the lengthwise direction of the optical guide 22, thereby being emitted from the optical guide 22. Here, the light is emitted through overall surfaces of the optical guide 22 except for both end surfaces where the light sources 21 are installed.

When the light generated from the light sources 21 is diffused through the optical guide 22, a sensing region, in which an object adjacent to the moving robot 100 may be sensed through the sensing system 20, is widened to an area approximately corresponding to light receiving regions, in which the light receiving sensors 23A, 23B, and 23C may receive light. Therefore, blind spots, deviating from the sensing region of the sensing system 20, in which the sensing system 20 does not sense an object adjacent to the moving robot 100, are greatly reduced, and objects adjacent to the moving robot 100 may be efficiently sensed through a small number of the light receiving sensors 23A, 23B, and 23C.

The optical guide 22 may be extended in one direction to have a designated length, and the light sources 21 are installed at both ends of the optical guide 22. The optical guide 22 is made of a transparent material to guide light, and the transparent material for the optical guide 22 may employ various kinds of materials, such as polycarbonate, acryl, glass, and optical fiber, which are transparent and have a higher density than air.

Therefore, light generated from the light sources 21 enters the optical guide 22 through both end surfaces of the optical guide 22, and the light entering the optical guide 22 is guided in the lengthwise direction of the optical guide 22. The light moving along the optical guide 22 is gradually emitted from the optical guide 22 according to various conditions, such as an incident angle of the light at an interface between the optical guide 22 and air and a difference of densities between the optical guide 22 and air. Therethrough, the light is diffused, and is emitted through the front, rear, upper and lower surfaces of the optical guide 22.

In this embodiment, the optical guide 22 may be extended in the circumferential direction of the main body 10 to correspond to the shape of the front surface of the main body 10, and is disposed on the bumper 13 such that the optical guide 22 moves forwards and backwards together with the bumper 13. A transparent window 13a is provided at a position of the bumper 13 corresponding to the optical guide 22 to transmit light.

A plurality of reflection grooves 22a to reflect the light entering the optical guide 22 forwards may be formed on the rear surface of the optical guide 22, and the rear surface of the optical guide 22 provided with the reflection grooves 22a functions as a reflection plane to reflect light. In this embodiment, the reflection grooves 22a are formed in the vertical direction perpendicular to the light moving in the optical guide 22, and reflect the light forwards. Here, a considerable amount of the light entering the optical guide 22 is guided forwards by the reflection grooves 22a formed on the rear surface of the optical guide 22, but since the optical guide 22 is made of the transparent material, the light entering the optical guide 22 is reflected by the reflection grooves 22a formed on the rear surface of the optical guide 22, and a considerable amount of the light diffused by the optical guide 22 is emitted through the front surface of the optical guide 22 and is used to sense an obstacle, and the remaining amount of the light diffused by the optical guide 22 is emitted downwards or backwards through the lower surface or the rear surface of the optical guide 22 and is used to sense a floor or the bumper 13.

Figure 5:
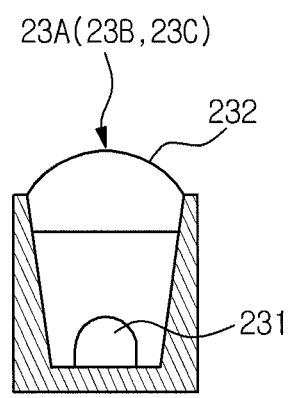
FIG. 5 is a schematic view of a light receiving lens applied to the moving robot in accordance with the embodiment of the present invention.

As shown in FIG. 5, each of the light receiving sensors 23A, 23B, and 23C may include a sensing part 231 to sense light, and a light receiving lens 232 disposed in front of the sensing part 231 to determine light receiving regions of the light receiving sensors 23A, 23B, and 23C. In this embodiment, the light receiving lens 232 is an asymmetric lens in which a light receiving region in the vertical direction and a light receiving region in the horizontal direction are independently determined. Such an asymmetric structure of the light receiving lens 232 serves to cope with the fact that the light receiving region in the vertical direction and the light receiving region in the horizontal direction are different according to installation positions and functions of the light emitting sensors 23A, 23B, and 23C.

Further, the light receiving sensors 23A, 23B, and 23C, as shown in FIG. 3, include obstacle sensors 23A to sense whether an object, such as a wall or a piece of furniture, is present in front of the main body 10, floor sensors 23B to sense a floor on which the moving robot 100 is placed, and bumper sensors 23C to sense a position of the bumper 13.

The obstacle sensors 23A sense whether an object is present in front of the main body 10. The obstacle sensors 23A are disposed above the optical guide 22 to be inclined downwards toward an area in front of the moving robot 100, thus receiving light from a lower portion of the area in front of the moving robot 100. Such a structure of the obstacle sensors 23A prevents the moving robot 100 from malfunctioning due to reception of sunlight or light emitted from an indoor illuminator by the obstacle sensors 23A. In this embodiment, plural obstacle sensors 23A are provided above the optical guide 22, and are separated from each other along the optical guide 22 in the circumferential direction, as shown in FIG. 2. Here, in order to minimize blind spots in which obstacles are not sensed, both sides of the light receiving region of each of the obstacle sensors 23A may be overlapped with the light receiving regions of the adjacent obstacle sensors 23A.

The light receiving region in the vertical direction of the light receiving lens 232 applied to the obstacle sensors 23A has a height corresponding to the height of the moving robot 100, and the light receiving region in the horizontal direction of the light receiving lens 232 is wide enough to overlap with the light receiving regions in the horizontal direction of the adjacent obstacle sensors 23A, as described above. Therefore, the light receiving lens 232 applied to the obstacle sensors 23A is configured such that the light receiving regions in the horizontal direction of the obstacle sensors 23A are wider than the light receiving regions in the vertical direction of the obstacle sensors 23A.

With reference to FIG. 3, the floor sensors 23B are disposed on the lower portion of the main body 10, and receive light emitted from the lower surface of the optical guide 22 and then reflected by the floor, thereby sensing whether the floor is present within a designated distance and thus preventing the moving robot 100 from falling.

Figure 4:
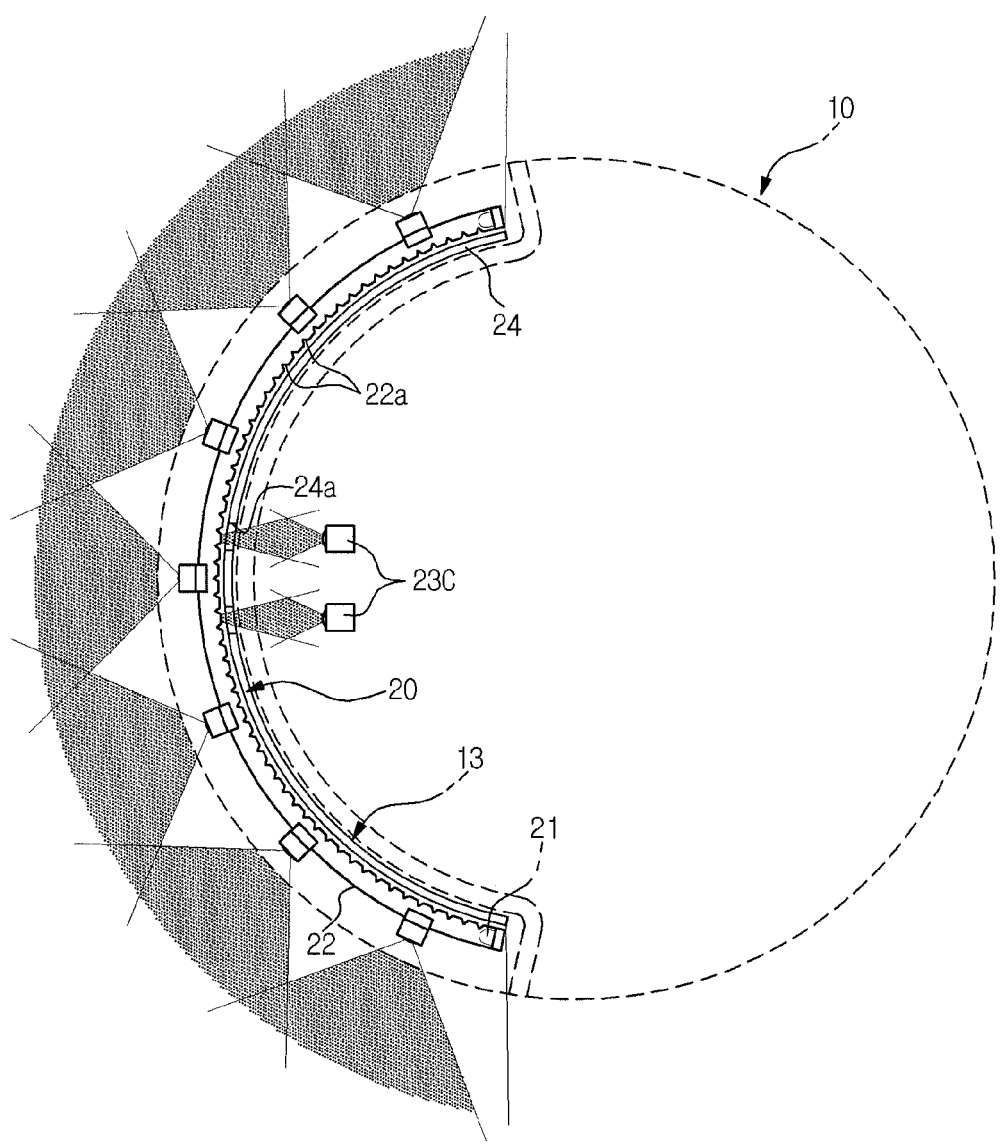

As shown in FIG. 4, the bumper sensors 23C are disposed at the rear of the optical guide 22, and receive light emitted from the rear surface of the optical guide 22, thereby detecting a change of the position of the bumper 13 and thus judging whether an obstacle collides with the bumper 13.

Here, the light emitted backwards through the rear surface of the optical guide 22 is emitted to a much wider region, but the bumper sensors 23C sense only the position of the bumper 13. Therefore, the bumper sensors 23C may perform a sufficient its own function as long as the bumper sensors 23C sense light of only a narrow region.

Therefore, in order to prevent light waste, a reflection member 24 to reflect light, emitted backwards from the optical guide 22, forwards is disposed at the rear of the optical guide 22 separately from the optical guide 22. The reflection member 24 is made of a white or silver plate, and is extended in the circumferential direction to correspond to the optical guide 22. Further, through holes 24a, through which light emitted from the optical guide 22 passes to proceed toward the bumper sensors 23C, are formed through the reflection member 24 at positions corresponding to the bumper sensors 23C.

Hereinafter, operation of the above moving robot 100 will be described with reference to FIGS. 3 and 4.

When the light sources 21 generate light, the light generated from the light sources 21 enters the optical guide 22 through both end surfaces of the optical guide 22. Then, a considerable amount of the light is reflected forwards by the reflection grooves 22a formed on the rear surface of the optical guide 22 and is emitted through the front surface of the optical guide 22, and the remaining amount of the light is emitted through the upper, lower, and rear surfaces of the optical guide 22.

During movement of the moving robot 100, when an obstacle, such as a wall or a piece of furniture, enters an obstacle sensing region formed in an overlapped area between a light emitting region to which the light emitted forwards from the optical guide 22 is irradiated and a light receiving region in which the obstacle sensors 23A receive light, the light emitted from the optical guide 22 is reflected by the obstacle and then is received by the obstacle sensors 23A. Thereby, sensing of the obstacle is achieved.

Further, during movement of the moving robot 100 along a floor, the floor on which the moving robot 100 is placed is present in a floor sensing region formed in an overlapped area between a light emitting region to which the light emitted through the lower surface of the optical guide 22 is irradiated and a light receiving region in which the floor sensors 23B receive light, and thus sensing of the floor is continuously carried out.

When the moving robot 100 reaches a position where the floor ends, the floor is not present in the floor sensing region, and an amount of light received by the floor sensors 23B is drastically reduced, thereby sensing that the floor ends.

Further, if the moving robot 100 inevitably collides with an obstacle during movement of the moving robot 100, the bumper 13 moves backward toward the main body 10 to buffer impact temporarily. Since the optical guide 22 is installed on the bumper 13, the optical guide 22 moves toward the main body 10 together with the bumper 13, and thereby a distance between the optical guide 22 and the bumper sensors 23C disposed on the main body 10 is reduced.

Since light is continuously emitted through the rear surface of the optical guide 22, as described above, the light is transmitted to the bumper sensors 23C via the through holes 24a. When the distance between the optical guide 22 and the bumper sensors 23C disposed on the main body 10 is reduced, an amount of light received by the bumper sensors 23C is increased, thereby sensing that the bumper 13 moves backward.

Although this embodiment illustrates that the plural reflection grooves 22a are formed on the rear surface of the optical guide 22 so that the rear surface of the optical guide 22 reflects light through the reflection grooves 22a, a white sheet to reflect light may be attached to the rear surface of the optical guide 22 without formation of the reflection grooves 22a so that the rear surface of the optical guide 22 may function as a reflection plane to reflect light forwards.

Further, white paint, silver paint or a light diffusion ink may be applied to the rear surface of the optical guide 22 without formation of the reflection grooves 22a so that the rear surface of the optical guide 22 may function as a reflection plane, or a white or silver toner is printed on the rear surface of the optical guide 22 so that the rear surface of the optical guide 22 may function as a reflection plane.

As is apparent from the above description, in a sensing system and a moving robot having the same in accordance with one embodiment, light irradiated from light sources is widely diffused through surfaces of an optical guide, thereby allowing light to be emitted to a wide region with a small number of light sources.

Further, a sensing region of the sensing system is greatly increased to an area corresponding to light receiving regions of light receiving sensors, thereby greatly reducing blind spots in which adjacent objects are not sensed.

Although a few embodiments have been shown and described, it would be appreciated by those skilled in the art that changes may be made in these embodiments without departing from the principles and spirit of the embodiments, the scope of which is defined in the claims and their equivalents.

What is claimed is:
1. A sensing system comprising:
a light source generating light;
an optical guide to diffuse and emit the light generated from the light source; and
light receiving sensors to receive the light emitted from the optical guide and then reflected by an object adjacent to the sensing system,
wherein the optical guide is extended in one direction;
the light source is installed at least one of both end surfaces of the optical guide; and light emitted from the light source enters the optical guide and is emitted through one side surface of the optical guide formed in the one direction of the optical guide.

2. The sensing system according to claim 1, wherein a reflection plane is provided on the other side surface of the optical guide to reflect light entering the optical guide toward the one side surface.

3. A moving robot comprising:
a main body; and
a sensing system to sense an object around the main body, wherein the sensing system includes:
a light source generating light;
an optical guide to receive, diffuse, and emit the light generated from the light source; and
light receiving sensors to receive the light emitted from the optical guide and then reflected by the object,
wherein the main body is formed in a disc shape; and
the optical guide is movable and extended in the circumferential direction of the main body to correspond to the main body, and disposed on the front surface of the main body.

4. The moving robot according to claim 3, wherein the light source is installed at least one of both end surfaces of the optical guide, and the light generated from the light source enters the optical guide through both end surfaces of the optical guide.

5. The moving robot according to claim 3, further comprising a reflection plane provided on the rear surface of the optical guide to reflect light entering the optical guide toward the front surface of the optical guide.

6. The moving robot according to claim 5, wherein a plurality of reflection grooves to form the reflection plane is provided on the rear surface of the optical guide.

7. The moving robot according to claim 5, further comprising a reflection member disposed at the rear of the optical guide to reflect light, emitted backwards from the optical guide, forwards.

8. The moving robot according to claim 5, wherein a white sheet to form the reflection plane is attached to the rear surface of the optical guide.

9. The moving robot according to claim 5, wherein any one of white paint or silver paint, or light diffusion ink to form the reflection plane is applied to the rear surface of the optical guide.

10. The moving robot according to claim 3, wherein the light receiving sensors include obstacle sensors disposed above the optical guide to receive light from the lower portion of an area in front of the optical guide.

11. The moving robot according to claim 3, wherein the light receiving sensors include floor sensors to receive light emitted downwards from the optical guide and then reflected by a floor.

12. A moving robot comprising:
a main body; and
a sensing system to sense an object around the main body, wherein the sensing system includes:
a light source generating light;
an optical guide to receive, diffuse, and emit the light generated from the light source;
light receiving sensors to receive the light emitted from the optical guide and then reflected by the object; and
a bumper installed at one side of the main body to move forward and backward, the optical guide being disposed on the bumper,
wherein the light receiving sensors include bumper sensors disposed at the rear of the optical guide of the main body to receive light emitted through the rear surface of the optical guide.

13. The moving robot according to claim 12, the moving robot further comprising: a plurality of through holes formed through the reflection member at position corresponding to the bumper sensor to transmit the light to the bumper sensors.

14. The moving robot according to claim 3, wherein each of the light receiving sensors includes a sensing part to sense light, and a light receiving lens disposed in front of the sensing part to determine light receiving regions of the light receiving sensors.

15. The moving robot according to claim 14, wherein the light receiving lens is an asymmetric lens in which a light receiving region in the vertical direction and a light receiving region in the horizontal direction are independently determined.

16. The moving robot according to claim 13, wherein a transparent window is formed through the bumper at a position corresponding to the obstacle sensors.

17. The sensing system according to claim 1, wherein the light is emitted through overall surfaces of the optical guide except for both end surfaces where the light source is installed.

18. The sensing system according to claim 1, wherein the optical guide is made of transparent material.

* * * * *